Figure 1:
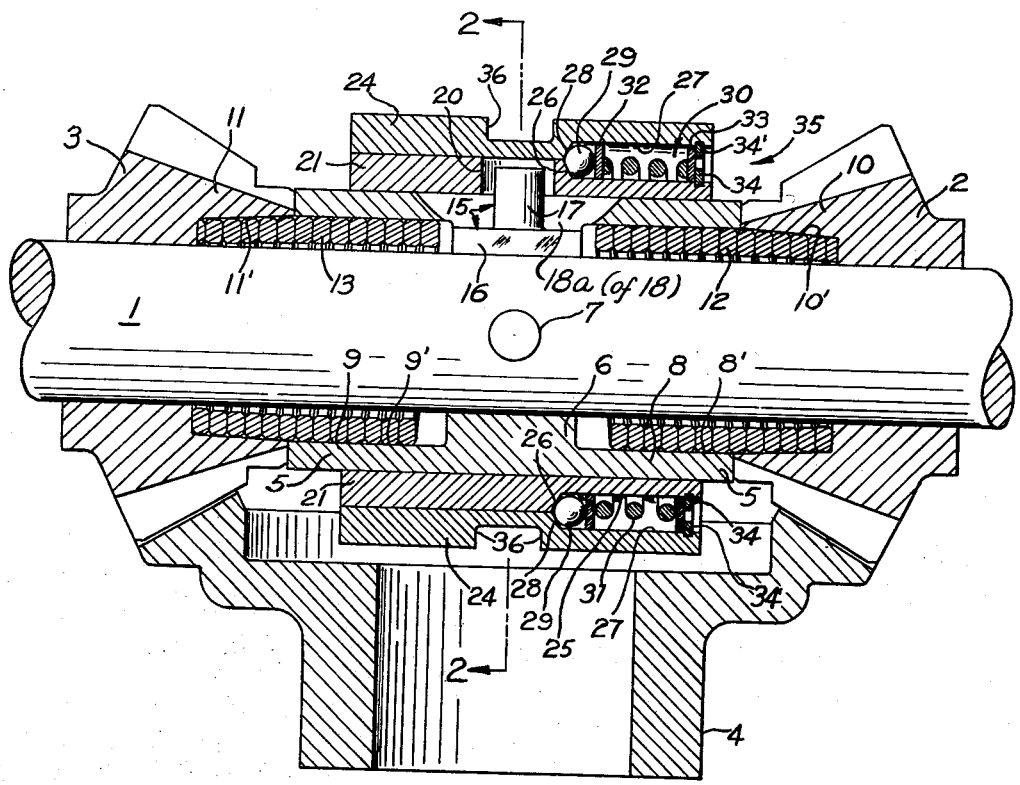

July 15, 1952 — C. P. PEPPER — 2,603,324
MULTIPLE CLUTCH FOR REVERSING GEAR MECHANISM
Filed Dec. 16, 1949

INVENTOR.
CARL P. PEPPER

Patented July 15, 1952

2,603,324

UNITED STATES PATENT OFFICE 2,603,324

MULTIPLE CLUTCH FOR REVERSING GEAR MECHANISM

Carl P. Pepper, Plainfield, Ind., assignor, by mesne assignments, to The Marquette Metal Products Company, Cleveland, Ohio, a corporation of Ohio Application December 16, 1949, Serial No. 133,323

4 Claims. (Cl. 192—48)

The invention relates to an improved reversing spring clutch and gear mechanism and to an improved actuating means for the spring clutch portion of such mechanisms, thereby indicating the principal objects.

The illustrative embodiment disclosed hereby is of a well known type of reversing gearing arranged for receiving unidirectionally applied torque and delivering output torque selectively in relatively opposite directions—such mechanisms being adapted for use in laundry machines and many others. In power wringers, for example, using spring clutch drives for the rolls it is desirable that the direction-selecting and clutch-actuating means such as a shifting fork or cam be moved for its full actuating stroke and held there until the clutch mechanism becomes active and the necessary work has been accomplished. The simplest manner of selectively energizing a pair of reversely driving coaxial spring clutches, during continuous rotation of a drive shaft for example, to expand or contract the springs against their cooperating drums is to cause an energizing lug or key slidable on the shaft to abut an end coil surface of the selected spring in the proper direction to produce the necessary coil expansion or contraction as the case may be. If during attempted energization the spring end coil is not in proper position to receive the lug or key, the latter cannot be moved its required spring-energizing distance until further relative rotation of the parts takes place. Thereby in a mechanism such as illustrated herewith a two-way yielding lost-motion device is necessary in order to permit the actuator (e. g. shifter fork) to be moved from a neutral position in either of the two necessary directions while yieldingly storing the required energy for clutch spring energization until the energizer and clutch elements have been brought into proper angular relationship as noted above. A specific object hereof is to provide a simplified yet efficient mechanism for performing the above indicated functions.

Figure 2:
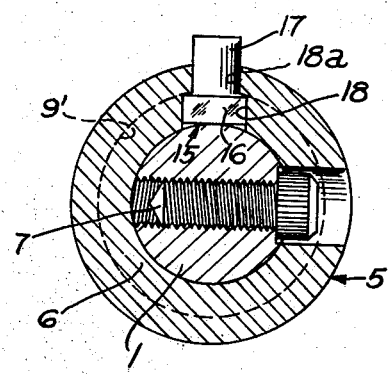

Other objects will become apparent from the following description of the illustrative reversing clutch and gear construction shown in the drawing wherein:

Fig. 1 is central sectional view through the clutch and gear assembly, and Fig. 2 is a transverse cross sectional detail view taken as indicated on Fig. 1.

Assuming shaft 1 is a continuously rotating input element the essential purpose of the mechanism is to selectively render either of the two toothed pinions 2 and 3, journalled for independent rotation on the shaft, active to drive an output gear member 4, meshing with the pinions, in different directions. Gear member 4 could be the continuously rotating driver instead, with shaft 1 serving as the output element.

Input shaft 1 has a tubular double clutch drum member 5 having a central thick walled portion 6 fitting the shaft and pinned thereto at 7. The drum portions 8 and 9 are identical and extend oppositely in spaced concentric relation to the shaft close to hollow inner end portions 10 and 11 of respective pinions. End coils of a pair of oppositely wound helical clutch springs 12 and 13 snugly occupy the sockets 10' and 11' of the pinions as one means of firmly anchoring the springs thereto for rotation therewith; and other coils of the springs are normally in slightly spaced or at least non-clutching relation to the circular drum surfaces 8' and 9' respectively.

The sockets 10' and 11' of the pinions are preferably slightly tapered so as to gradually increase the gripping force on the embraced spring coils and additionally one or more of the coils at the bottoms of respective sockets may be initially expanded beyond the others to increase the anchorage pressure of those coils.

The inner, energizing, free end coils of the clutch springs 12 and 13 terminate abruptly (not illustrated) for selective engagement by an energizing key 15 of T-shape, providing a bar portion 16 of generally rectangular section (Fig. 2) and a shank or operating stem 17 shown as cylindrical. The bar portion 16 is guided in a slot 18 in the drum member 5 so that it can be projected selectively, by operation of the shank or stem as will be described, beyond the thickened drum portion 6 into clutch-spring-energizing positions not shown. With the key in the illustrated central position neither clutch spring can be energized.

The shank portion 17 of the key 15 extends through a transversely narrowed portion 18a of the slot 18 thereby providing shoulders overhanging the bar portion of the key to prevent it from tilting out of parallelism with the shaft 1 which forms part of its sliding support. The shank 17 projects radially beyond the drum member 5 for engagement by diametrically opposite walls of a hole 20 in an energizer sleeve 21 of tubular form which is easily slidable on the external surface of drum member 5. The energizer sleeve in the particular construction shown is limited by the key 15 from turning relative to the drum member 5. The sleeve 21, through the expedient of substituting an internal peripheral groove for the opening 20, could remain stationary while the drum 5 turns, but the side walls of the groove would then impose considerable wear on the adjacent sides of the stem or shank 17 of the key.

An actuator or energizer collar 24 rides the energizer sleeve 21 and is freely turnable on it as well as shiftable axially in either direction relative thereto. The outer periphery of the sleeve 21 near one end has a reduced diameter smooth hardened surface portion 25 terminating in an external frusto conical smooth hardened shoulder 26. The interior of the collar 24 is similarly formed and finished internally, providing a counterbore surface 27 and frusto conical internal shoulder 28 matching the shoulder 26 in position. A complete row of conventional metal bearing balls 29 ride the matching shoulders 26 and 28 in rolling contact with surfaces 25 and 27. The circular cylindrical socket 30 formed as just described contains a fairly strong compression spring 31 held in position between annular washers 32 and 33 which in turn are retained respectively through some initial preloading of the spring 31 against the balls 29 and a pair of snap rings 34 and 34' which complete the energizer (collar, sleeve, etc.) assembly 35. The snap rings engage respective grooves in the sleeve 21 and collar 24.

Sometimes the collar 24, as illustrated, has a peripheral groove 36 for engagement with a shifter fork or pin and sometimes the collar has a stud (not shown) projecting radially therefrom for engagement with a shifting cam. In the latter case the collar 24 does not rotate. It need not in either case.

Assuming the operation calls for driving of the pinion 2 for rotation of gear 4 in one direction the collar 24 is given a full shifting stroke to the right which through pressure of thrust shoulder surface 28 on the balls 29 may move the entire assembly 35 the necessary distance to bring the right hand end of key 15 into energizing juxtaposition with the free end of clutch spring 12 to expand it against drum surface 8'. However, if the free end coil terminal surface at the time of shifting of the assembly 35 is considerably out of register with the key (as is usually the case) then the row of balls 29 through washer 32 compresses the spring an amount proportionate to the degree of non-registration. That operation, through washer 33 and inner snap ring 34, yieldably maintains the necessary shifting force on the sleeve 21 so that the key 15 gradually rides down the end coil of the spring until it abuts the energizing terminal surface of said coil. If any force restrains or retards rotation of the collar 24 during the above described operation the balls 29 roll against the washer 32 and frusto conical shoulder 28 as the remainder of the assembly rotates with the energizer sleeve 21. Thus there is practically no sliding friction as a result of axially imposed shifting force regardless of how much the spring 31 has to be compressed.

Similarly when the operation calls for transmission of driving torque through the clutch spring 13 to the pinion 3 for reverse driving of the gear 4 the energizer assembly 35 is shifted to the left from or through the illustrated neutral position and then (assuming non-registration of the key 15 and free end coil terminal surface of clutch spring 13) the necessary amount of compression of shifter spring 31 is accomplished by leftward thrust of the outer snap ring 34' on washer 33. In that case the stored energy in the spring 31, through washer 32, maintains the balls 29 in rolling contact with the shoulder 26 of the energizer sleeve 21; or in other words the operation involves essentially the reverse of the first described manner of delivering and applying axial thrust forces mainly through rolling friction in case rotation of the energizing collar 24, the spring 31 and associated washers is restrained or retarded.

If the compression spring 31 is preloaded as preferred and the energizer 24 is prevented or frictionally restrained from turning with the energizer sleeve 21 there is apt to be wear on the parts of the energizer assembly when in neutral position—for example between washer 33 and one of the snap rings. If the distance between either shoulder 26 and 28 and the snap ring on the associated part is slightly greater than between the shoulder and snap ring of the other part there is then a little axial free play between the sleeve 21 and collar 24 but such wear will not occur.

The energizer assembly 35 obviously insures approximate registration of the energizing collar 24 and sleeve 21 when no axial shifting or opposing forces are being imposed. That enables the energizer sleeve 21 to have an operatively positive neutral position corresponding to the position of the collar 24 with no likelihood of accidental engagement of the energizing key with either clutch spring.

I claim:

1. Mechanism for selectively energizing two oppositely positioned coaxial helical clutch springs in respect to cooperating drum surfaces; said mechanism comprising a generally cylindrical member adapted to be guided for rectilinear movement in opposite directions from a normal position, clutch spring energizing means operatively connected to said member for movement, thereby said means being engageable selectively with shoulders at the free end coils of respective said clutch springs, an actuating collar around the member and axially shiftable thereon, axially spaced pairs of substantially matching shoulders, one shoulder of each pair being on the member and the other shoulder of each pair being on the collar, and a single compression spring cooperating with the shoulders of said pairs normally to maintain the member and collar approximately in a predetermined relationship axially of each other, said compression spring having axial yield such as will permit the collar to be moved axially in opposite directions relative to the member the necessary distance in each case to effect subsequent energization of the selected clutch spring by re-expansion of the compression spring notwithstanding temporary blocking of the movement of the member by such clutch spring.

2. Mechanism according to claim 1, further characterized by provision of a set of anti-friction bearing members maintained by the compression spring against a shoulder of one said pair when the collar is moved axially in one direction relative to the sleeve, the spring maintaining the bearing members against the other shoulder of the same pair during opposite movement of the collar.

3. Mechanism according to claim 1 wherein one pair of shoulders comprise oppositely sloping surfaces of the collar and said member respectively, and the spring bears alternately on said sloping surfaces during axial shifting of the collar in opposite directions relative to the member through the intermediary of a set of bearing balls riding one or the other of said sloping surfaces depending upon the direction of movement of the collar.

4. Mechanism according to claim 1 wherein said member and collar, in a normal relative position thereof axially of the collar provide a cylindrical housing space for the compression spring defined at one end by frusto-conical approximately matching surfaces of the member and collar forming one pair of shoulders, the compression spring operatively bears against said shoulders through the intermediary of a set of bearing balls, and the opposite end of the spring is retained in the housing space by radially spaced apart snap rings in the member and collar respectively which rings form the the other pair of shoulders.

CARL P. PEPPER.

REFERENCES CITED

The following references are of record in the file of this patent:

UNITED STATES PATENTS

| Number | Name | Date |
|---|---|---|
| 776,404 | Keyser | Nov. 29, 1904 |
| 945,301 | Baudoux | Jan. 4, 1910 |
| 1,472,854 | Schneider | Nov. 6, 1923 |
| 2,235,266 | Starkey | Mar. 18, 1941 |
| 2,446,064 | Smith | July 27, 1948 |